(12) United States Patent
Goel et al.

(10) Patent No.: US 6,999,981 B2
(45) Date of Patent: Feb. 14, 2006

(54) CIRCUIT FOR COMPUTING THE ABSOLUTE VALUE OF COMPLEX NUMBERS

(75) Inventors: Manish Goel, Dallas, TX (US); Srinath Hosur, Plano, TX (US); Michael O. Polley, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 711 days.

(21) Appl. No.: 10/057,137

(22) Filed: Jan. 25, 2002

(65) Prior Publication Data

US 2002/0147751 A1 Oct. 10, 2002

Related U.S. Application Data (60) Provisional application No. 60/267,452, filed on Feb. 8, 2001.

(51) Int. Cl.
*G06F 7/00* (2006.01)
*G06F 7/38* (2006.01)

(52) U.S. Cl. ...................................... 708/201; 708/606
(58) Field of Classification Search ................ 708/201, 708/605–606
See application file for complete search history.

(56) References Cited

U.S. PATENT DOCUMENTS 4,736,334 A * 4/1988 Mehrgardt .................. 708/605
4,787,056 A * 11/1988 Dieterich .................... 708/606

* cited by examiner

*Primary Examiner*—Tan V. Mai
(74) *Attorney, Agent, or Firm*—Robert D. Marshall, Jr.; W. James Brady, IIII; Frederick J. Telecky, Jr.

(57) ABSTRACT

An apparatus (100) for computing the absolute value of a complex number includes separate squaring units (110, 115) for the real and imaginary parts. A square root unit (130) extracts the square root of the sum (120) of these squares, which is absolute value of the complex number. Each squaring unit includes one unsigned multipliers for respective least significant and two signed multipliers for respective most significant bits and a cross term. The products are aligned by shifting and summed. The square root unit employs identical processing elements, each considering two bits of the input and forming one root bit and a remainder. Each processing element compares two intermediate test variables, and selects a "1" or "0" for the root bit and the next remainder based upon this comparison. A chain of processing elements enables computation of the root to the desired precision. Alternatively, the same processing elements may be used in a recirculating manner.

7 Claims, 4 Drawing Sheets

CIRCUIT FOR COMPUTING THE ABSOLUTE VALUE OF COMPLEX NUMBERS

CLAIM OF DOMESTIC PRIORITY

This application claims priority under 35 U.S.C. 119(e)(1) from U.S. Provisional Application No. 60/267,452 filed Feb. 8, 2001.

TECHNICAL FIELD OF THE INVENTION

The technical field of this invention is digital signal processing.

BACKGROUND OF THE INVENTION

A complex number is a number of the form $x=x_r+jx_i$: where $x_r$ is called the real part of the complex number; $x_i$ is called the imaginary part of the complex number; and j is the square root of $-1$, the basic imaginary number. Complex numbers are often used to represent two dimensional vector quantities, the real and imaginary parts forming two perpendicular components of the vector. In this representation the magnitude of the vector can be obtained from the absolute value of the complex number.

The absolute value of the number x is calculated as the square root of the sum of the squares of its real and imaginary parts. This is:

$$ABS(x) = \sqrt{X_r^2 + X_i^2}$$

Some digital processing applications require multiple computations of the magnitude of a two dimensional vector. This computation is the equivalent of calculating the absolute value of a complex number.

SUMMARY OF THE INVENTION

This invention is an apparatus for computing the absolute value of a complex number having a real part and an imaginary part. The apparatus includes first and second squaring units for the respective real and imaginary parts. The squares are summed in a summing unit. A square root unit extracts the square root of the sum. This square root is absolute value of the complex number.

Each squaring unit includes one unsigned multiplier and two signed multipliers. An unsigned multiplier multiplies the least significant bits of the input. The first signed multiplier multiplies the most significant bits of the input. These two outputs are concatenated into one input of a signed summer. The second signed multiplier multipliers the least significant bits of the input times the most significant bits. This signed product is left shifted into a second input of the signed summer an amount to properly align it with the other sum term. The sum output is the square. The unsigned and first signed multipliers in this technique are also squaring units. This technique can be used recursively on these multipliers.

The square root unit employs identical processing elements. Each processing element considers two bits of the input and forms one root bit and a remainder. The processing element forms two intermediate test variables from the input data, the prior remainder and the prior root. These two test variables are compared. The result of the comparison selects a "1" or "0" for the root bit and selects the next remainder. Processing proceeds to the next processing element for computation of the next root bit. A chain of processing elements enables computation of the root to the desired precision. Alternatively, the same processing elements may be used in a recirculating manner.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
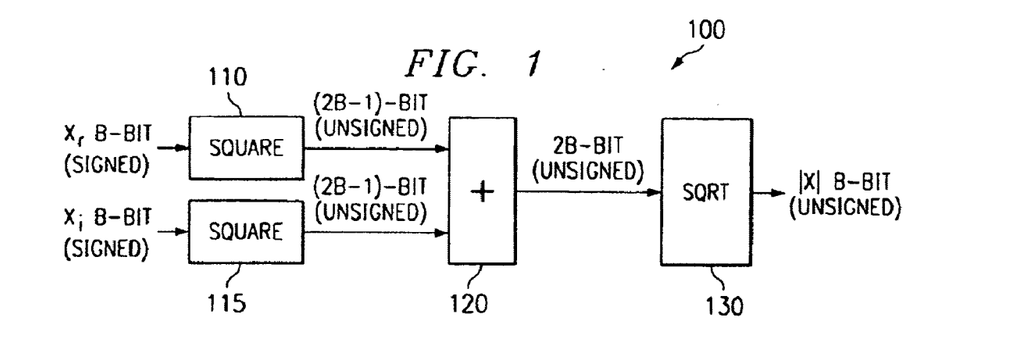
FIG. 1 illustrates the circuit of this invention for computing the absolute value of a complex number.

FIG. 1 illustrates a block diagram for computing the absolute value of complex number x. FIG. 1 assumes that complex number x has both real part $x_r$ and imaginary part $x_i$ represented by B bit signed numbers. In accordance with the known art, if the number is positive, then the most significant bit is 0. The B−1 least significant bits are interpreted normally. If the number is negative, then the most significant bit is 1. The B−1 least significant bits are interpreted according to the 2's complement notation. Real part $x_r$ supplies the input to squaring unit 110. The output is a 2B−1 bit unsigned number. Imaginary part $x_i$ supplies the input to an identical squaring unit 115. The output of squaring unit 115 is also a 2B−1 bit unsigned number. These squared terms are supplied to the inputs of summing unit 120. Summing unit 120 adds these two inputs producing a 2B bit unsigned output. This 2B bit sum supplies the input to square root unit 130. Square root unit 130 supplies the desired absolute value of x ($|x|$) as a B bit unsigned number. Note that the desired absolute value is bound by the following inequality:

$$0 \leq ABS(x) \leq 2^{B-(1/2)}$$

Thus a B bit unsigned number can represent all possible absolute values.

A straight forward manner to implement the squaring units 110 and 115 employs a B bit signed multiplier. It is known that such a signed multiplier would require approximately $B^2$ one bit adders. A better solution exploits the known characteristics of a squaring operation. Assume the problem is to compute b=a*a. The input number a is divided into least significant bits and most significant bits. Assuming a has B bits (a[B−1:0]), then define least significant bits $a_{lsb}$ as:

$$a_{lsb} = a[(B/2)-1, 0]$$

and define most significant bits $a_{msb}$ as:

$$a_{msb} = a[B-1, B/2]$$

In accordance with this definition $a=a_{msb}*2^{B/2}+a_{lsb}$. Thus:

$$b = a*a$$
$$= (a_{msb}*2^{B/2} + a_{lsb})(a_{msb}*2^{B/2} + a_{lsb})$$
$$= a_{msb}*2^{B/2}(a_{msb}*2^{B/2} + a_{lsb}) + a_{lsb}(a_{msb}*2^{B/2} + a_{lsb})$$
$$= a_{msb}^2*2^{(B/2)+(B/2)} + 2a_{msb}*a_{lsb}*2^{B/2} + a_{lsb}^2$$
$$= a_{msb}^2*2^B + a_{msb}*a_{lsb}*2^{(B/2)+1} + a_{lsb}^2$$

Figure 2:
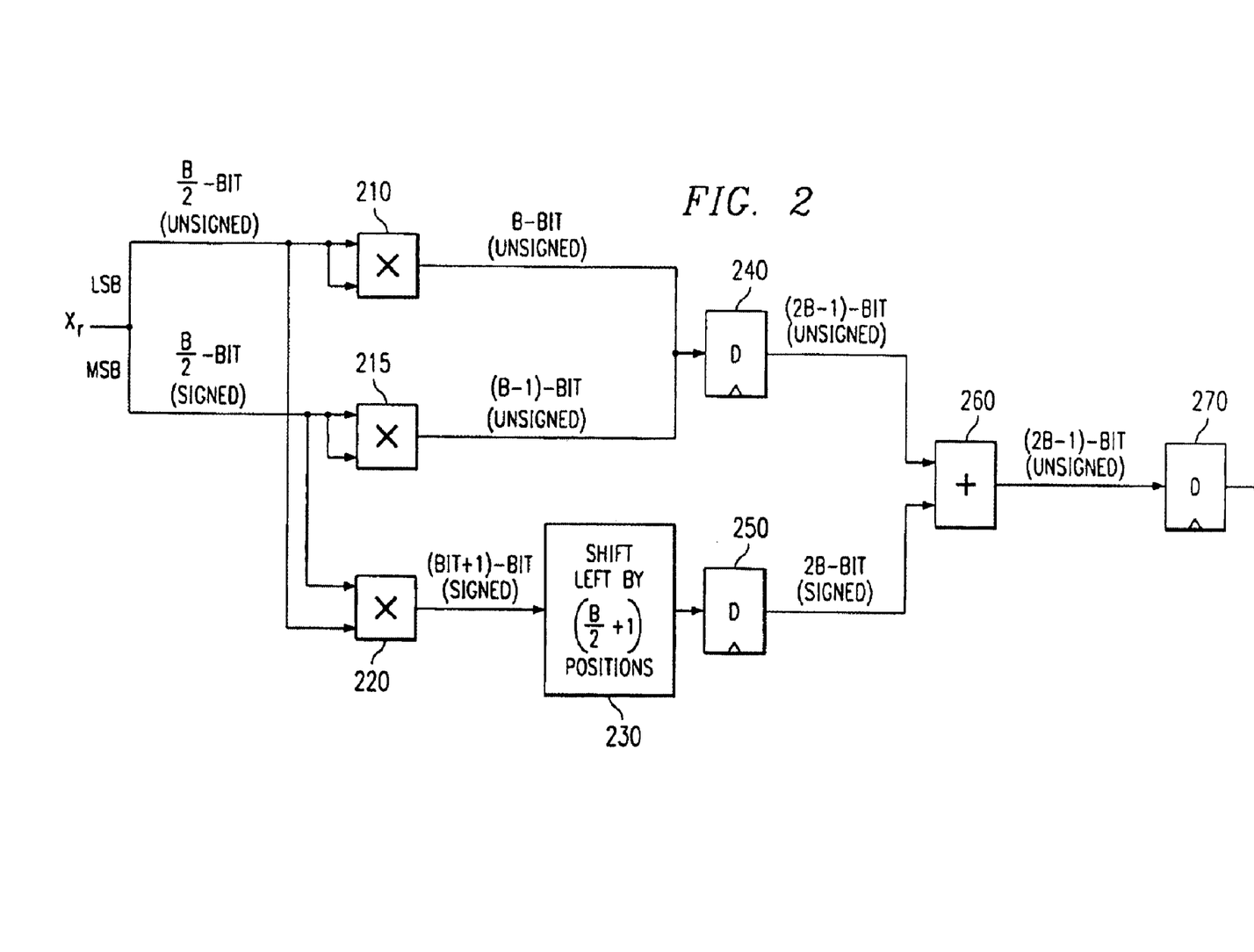
FIG. 2 illustrates the preferred construction of each of the squaring units illustrated in FIG. 1.

FIG. 2 illustrates in block diagram form a circuit 110 for computing the square in this manner. The least significant bits $a_{lsb}$ are supplied to both inputs of multiplier 210. Multiplier 210 thus forms the term $a_{lsb}^2$. Because $a_{lsb}$ includes B/2 bits, the product output of multiplier 210 has 2(B/2)=B bits. Multiplier 210 is an unsigned multiplier. Note that the square is positive whatever the sign of the input number. The most significant bits $a_{msb}$ are supplied to both inputs of multiplier 215. Multiplier 215 thus forms the term $a_{msb}^2$. Because the maximum output value is positive and not greater than $2^{B-2}$, $a_{msb}^2$ includes B−1 bits. Note that whether a is negative or positive, the product is positive. Accordingly, the output of multiplier 215 is unsigned.

The respective outputs of multipliers 210 and 215 are supplied to 2B bit latch 240. The output of multiplier 210 forms the least significant bits of the input to latch 240. The output of multiplier 215 forms the most significant bits of the input to latch 240. This left shifts the product of multiplier 215 by B bits, effectively multiplying the product output by $2^B$. Note that this shift ensures that the two product outputs do not overlap. This loads latch 240 with the quantity $a_{msb}^2*2^B+a_{lsb}^2$.

Multiplier 220 forms the cross product term. One input of multiplier 220 receives the least significant bits $a_{lsb}$ and the other input of multiplier 220 receives the most significant bits $a_{msb}$. While the B/2 least significant bits $a_{lsb}$ are unsigned, the most significant bits $a_{msb}$ includes (B/2)−1 data bits and one sign bit. Accordingly, the multiplier 220 is signed.

The output of multiplier 220 supplies the input of shifter 230. Shifter 230 left shifts its input by (B/2)+1 bits. This effectively multiplies the product output of multiplier 220 by $2^{(B/2)+1}$. The output of shifter 230, which corresponds to $a_{msb}*a_{lsb}*2^{(B/2)+1}$, is stored in latch 250. Note that shifter 230 may include merely loading the product output from multiplier 220 into appropriate bit positions within latch 250 and zero filling the lower (B/2)+1 bits of latch 250.

Adder 260 receives the contents of latches 240 and 250 at its two inputs. The sum result equals the desired square.

The structure of FIG. 2 requires less hardware and consequently less integrated circuit area to implement than a straight forward signed multiplier. As noted above, a signed multiplier requires about $B^2$ one bit adders. The circuit of FIG. 2 employs three B/2 bit multiplier. Each of these multipliers thus requires about $(B/2)^2=B^2/4$ one bit adders. The three multipliers thus require about $3B^2/4$ one bit adders. This is about 25% less than the conventional circuit. Note further that both multipliers 210 and 215 are used as squaring units in FIG. 2. This technique could be used to implement both multipliers 210 and 215 to achieve an additional 12.5% circuit savings. This technique could be used further for the least significant bit multipliers and the most significant bit multipliers in those circuits. This technique could be used recursively until the smallest multipliers are one bit multipliers. The inventors believe that the integrated circuit layout required for recursive use of this technique will reach a point where no additional benefit is achieved before reaching one bit multipliers. However, it would generally be advantageous to employ this technique to two levels.

The above description assumed that the number of input bits B is even. Thus B/2 is an integer. If B is odd, then the number of least significant bits can not equal the number of most significant bits. Let there be (B−1)/2 least significant bits and (B+1)/2 most significant bits. Thus $a=a_{msb}*2^{(B-1)/2}+a_{lsb}$ and:

$$b = a*a$$
$$= (a_{msb}*2^{(B-1)/2} + a_{lsb})(a_{msb}*2^{(B-1)/2} + a_{lsb})$$
$$= a_{msb}*2^{(B-1)/2}(a_{msb}*2^{(B-1)/2} + a_{lsb}) + a_{lsb}(a_{msb}*2^{(B-1)/2} + a_{lsb})$$
$$= a_{msb}^2*2^{((B-1)/2)+((B-1)/2)} + 2a_{msb}*a_{lsb}*2^{(B-1)/2} + a_{lsb}^2$$
$$= a_{msb}^2*2^{(B-1)} + a_{msb}*a_{lsb}*2^{((B-1)/2)+1} + a_{lsb}^2$$
$$= a_{msb}^2*2^{(B-1)} + a_{msb}*a_{lsb}*2^{(B+1)/2} + a_{lsb}^2$$

The products of multipliers 210 and 215 would be concatenated as illustrated in FIG. 2 effectively multiplying the product output of multiplier 215 by $2^{B-1}$. Shifter 230 requires a left shift of (B+1)/2 bits effectively multiplying the product output of multiplier 220 by $2^{(B+1)/2}$. Alternatively, the input could be divided into (B+1)/2 least significant bits and (B−1)/2 most significant bits. Thus $a=a_{msb}*2^{(B+1)/2}+a_{lsb}$ and:

$$b = a*a$$
$$= (a_{msb}*2^{(B+1)/2} + a_{lsb})(a_{msb}*2^{(B+1)/2} + a_{lsb})$$
$$= a_{msb}*2^{(B+1)/2}(a_{msb}*2^{(B+1)/2} + a_{lsb}) + a_{lsb}(a_{msb}*2^{(B+1)/2} + a_{lsb})$$
$$= a_{msb}^2*2^{((B+1)/2)+((B+1)/2)} + 2a_{msb}*a_{lsb}*2^{(B+1)/2} + a_{lsb}^2$$
$$= a_{msb}^2*2^{(B+1)} + a_{msb}*a_{lsb}*2^{((B+1)/2)+1} + a_{lsb}^2$$
$$= a_{msb}^2*2^{(B+1)} + a_{msb}*a_{lsb}*2^{(B+3)/2} + a_{lsb}^2$$

Concatenation of the product outputs of multipliers 210 and 215 at the input of data latch 240 effectively multiplies the most significant bits by $2^{(B-1)/2}$. Shifter 230 must provide a left shift of (B+3)/2 bits effectively multiplying the product output of multiplier 220 by $2^{(B+3)/2}$.

Figure 3:
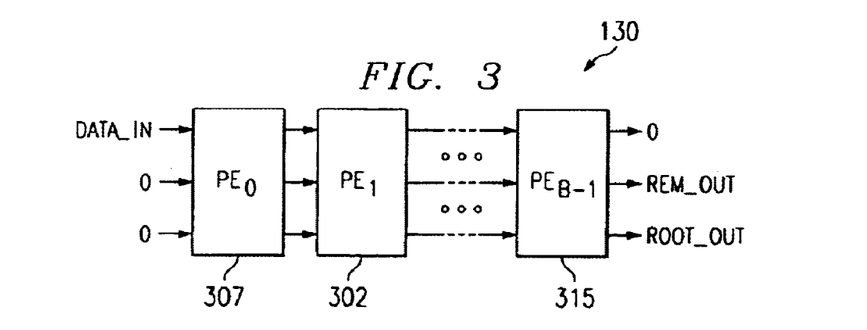
FIG. 3 illustrates a chain of processing elements employed in the square root unit illustrated in FIG. 1.
Figure 4:
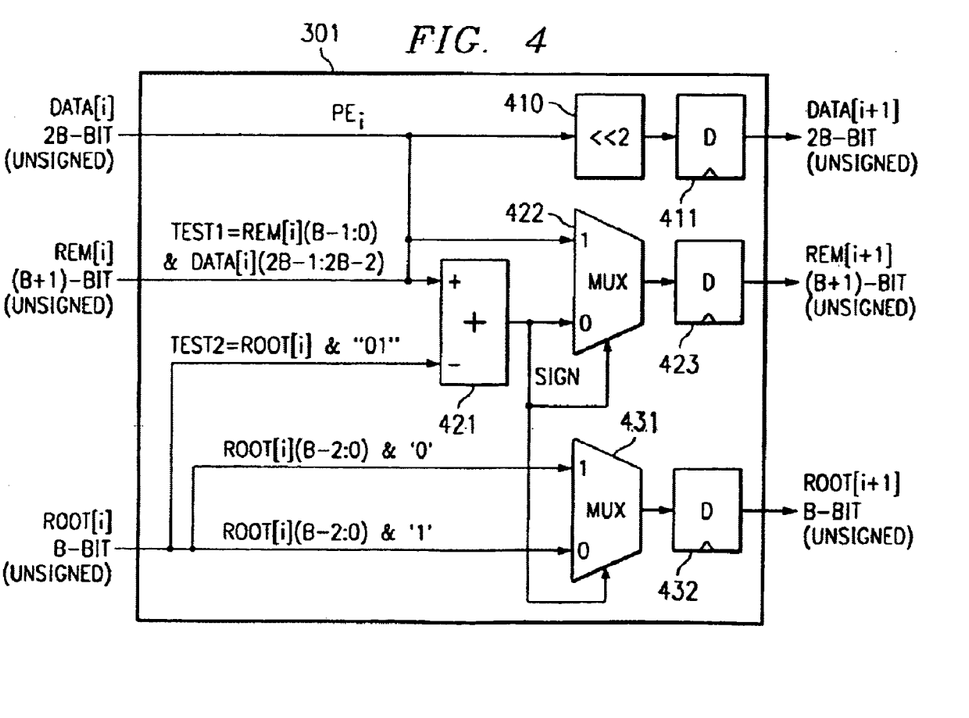
FIG. 4 illustrates the construction of each processing element of FIG. 3.

FIGS. 3 and 4 illustrate hardware embodying square root unit 130. This hardware implements an iterative square root extraction according to the following algorithm:

```
INITIALIZATION
    data[0] = y(2B−1:0);
        root[0] = 0
        rem[0] = 0
LOOP
    FOR i=0:1:B−1 LOOP
        test1 = rem[i](2B−3:0)<<2 & data[i](2B−2:2B−2);
        test2 = root[i](B−1:0)<<2 & "01";
        IF test1 < test2 THEN
            root[i+1] = root[i](B−2:0)<<1 & "0";
            rem[i+1] = test1;
        ELSE
            root[i+1] = root[i](B−2:0)<<1 & "1";
            rem[i+1] = test1 − test2;
        END IF;
        data[i+1] = data[i] << 2;
    END LOOP;
```

The algorithm operates as follows. The data variable is initialized to the function argument of the square root unit.

The variable root[i] holds the current square root value and the variable rem[i] holds the current remainder value. These are initialized to zero. As previously described, the output of adder 260 is 2B−1 unsigned bits (y(2B−2:0)). Each loop iteration or each hardware processing element considers two bits of the input and produces one bit of the square root.

The algorithm forms two intermediate variables and checks their relative magnitude. The first intermediate variable test1 is formed by concatenating the current remainder left shifted by two bits with the two most significant bits of the current data. Thus the two most significant bits of the current data become the two least significant bits of the intermediate variable test1. The second intermediate value test2 is formed by concatenating the current root left shifted by two bit with the digital constant "01". Thus the two least significant bits of test2 become "01". The algorithm then compares test1 and test2. If test1 is less than test2, then the next root value root[i+1] is set to the concatenation of the prior root value root[i] left shifted one bit with "0". The next remainder value rem[i+1] is set equal to test1. If test1 is not less than test2, then the next root value root[i+1] is set to the concatenation of the prior root value root[i] left shifted by one bit with "1". The next remainder value rem[i+1] is set equal to test1 minus test2. Following the IF, THEN ELSE operation, the next data value data[i+1] to the prior data value data[i] left shifted two bits. This process repeats unit B root bits are formed. The left shifting of root[i] and rem[i] shift out initial zeros that are filled with one bit of data each iteration. The left shifting of data[i] shifts out two data bits already considered in the current iteration shifting in the next two bits for the next iteration.

FIG. 3 illustrates a hardware implementation of this algorithm. FIG. 3 illustrates that square root unit 130 consisting of processing elements ($PE_j$) 301, 302 . . . 315 connected in cascade. Each stage 301, 302 . . . 315 includes inputs for data (data_in), the current remainder and the current root. Each stage 301, 302 . . . 315 produces an next data output (data_out), a next remainder output (rem_out) and a next root output (root_out). Stage 301 receives the function argument of the square root unit as its data_in and zero for both the remainder input and the root input. Each stage supplies: its data_out to the data_in of the next stage; its remainder output rem_out to the remainder input rem_in of the next stage; and its root output root_out to the root input root_in of the next stage. In accordance with the algorithm, there need to be half as many stages as input data bits to compute the integer part of the square root. In this example there are 2B data bits and thus there are B stages.

FIG. 4 illustrates the internal components of representative stage 301. Stage 301 receives data[i], rem[i] and root[i] inputs from the prior stage. As noted above, for the first stage data[i] is the function argument of the square root unit and both rem[i] and root[i] are 0. Shifter 410 left shifts data[i] and stores the result in data latch 411. This data stored in data latch 411 forms the output data[i+1].

Figure 5:
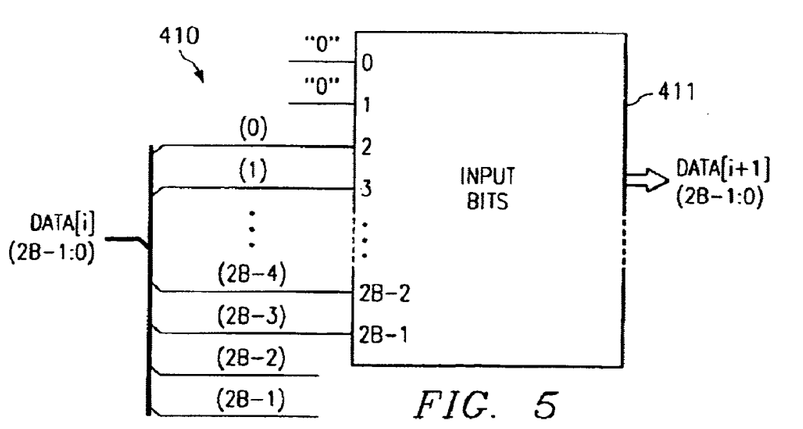
FIG. 5 illustrates details of the shifting unit illustrated in FIG. 4.

FIG. 5 illustrates a practical embodiment of shifter 410. Individual bits of the 2B−1 bits of data[i] are coupled to shifted input bits of data latch 411. The two least significant bits, bits 0 and 1, receive a zero signal. Thus data latch 415 stores "0" in these data locations. Data bit 0 is supplied to input bit 2, data bit 1 is supplied to input bit 3. Data bit 2B−3 is supplied to input bit 2B−1. The two most significant bits, bits 2B−1 and 2B−2, are not coupled to any input of data latch 415. These bits are not stored and thus lost. This is similar to that previously described in conjunction with shifter 230 illustrated in FIG. 2.

Figure 6:
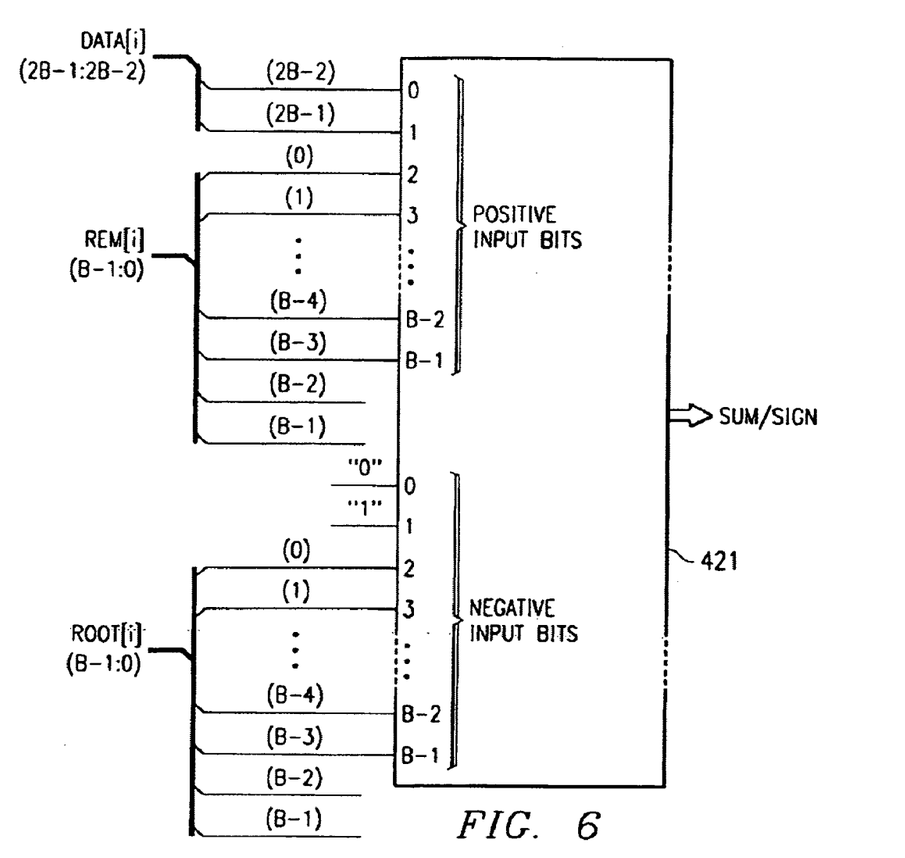
FIG. 6 illustrates details of the input to the summing unit illustrated in FIG. 4.

FIG. 6 illustrates formation of the two test variables test1 and test2. Test1 is formed by concatenation of the two most significant bits of data[i] and rem[i]. As shown in FIG. 6, data[i] bit 2B−2 supplies the input to the 0 bit of the positive input of summer 421. Data[i] bit 2B−1 supplied the input to the 1 bit of the positive input of summer 421. The various bits of rem[i] are left shifted two bits and supplied to the positive input of summer 421. This is similar to the application of data[i] bits to data latch 411 illustrated in FIG. 5 and described above. Note that the two most significant bits of rem[i], bits B−1 and B−2, are not coupled to any input of data latch 415. These bits are not stored and thus lost. No data is actually lost because these bits are always "0" from the initialization of rem[i]. Not shown in FIG. 6 but illustrated in FIG. 4, this variable test1 is also supplied to one input of multiplexer 422. FIG. 6 illustrates a similar connection for the negative input of summer 421. This forms the second test variable test2. The two least significant bits receive a digital constant "01" and the remaining input bits receive corresponding bits of rem[i] left shifted by two bits.

Summer 421 forms the difference of test2 minus test1. Summer 423 forms two outputs. The first output is the difference. This difference output supplies one input of multiplexer 422. The second output is the sign of the difference. This sign is 0 if test1 minus test2 is positive or test1>test2. This sign is 1 if test1 minus test2 is negative or test1<test2. This sign output supplies the control signal of multiplexers 422 and 431.

Figure 7:
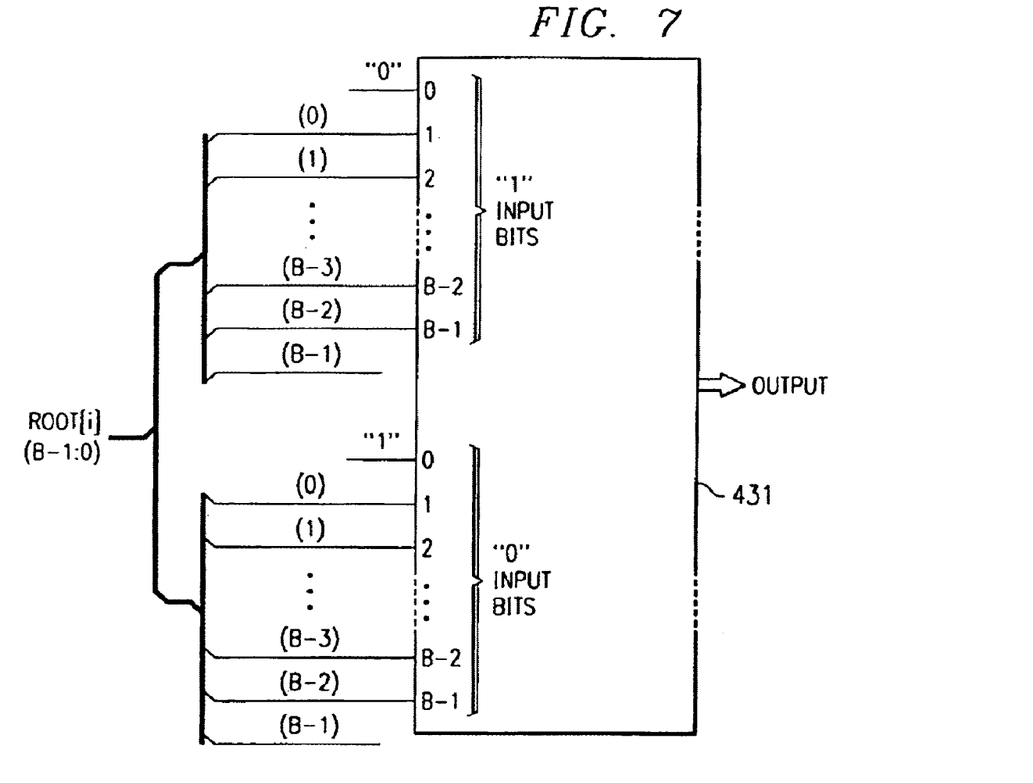
FIG. 7 illustrated details of the input to one of the multiplexers illustrated in FIG. 4.

FIG. 7 illustrates in greater detail the input connections to multiplexer 431. The first input of multiplexer 431 receives at its least significant a digital constant "0". The remaining bits are received from root[i] left shifted one bit. The most significant bit of root[i] is not connected and is lost. As previously described, this is always a 0 from the initialization of root[i], so no data is lost. The second input of multiplexer 431 is similar, except that the least significant input bit received a digital constant "1".

The sign output of subtractor 421 controls the selections made by multiplexers 422 and 431. Multiplexer 422 receives the test1 signal at a first input and the difference signal (test1−test2) at a second input. If the sign output is "1", multiplexer 422 selects the test1 signal for input to latch 423. If the sign output is "0", multiplexer 422 selects the difference signal for input to latch 423. The output of latch 423 is the next remainder signal rem[i+1]. If the sign output is "1", multiplexer 431 selects the input with the least significant bit "0" for input to data latch 432. If the sign output is "0", multiplexer 431 selects the input with the least significant bit "1" for input to data latch 434. The output of latch 432 is the next root signal root[i+1].

The number of bits required for the remainder depends upon the number of bits of the desired answer. The example of FIG. 3 assumed that only the integer part of the square root was needed. This selection determined the number of processing elements required to produce the desired solution. If only the integer part of the square root is desired, then the square root unit needs only half as may stages as input data bits. If 2B is precision of the input data, the root and the remainder need B and B+1 bits, respectively. If y is the input data, x is the integer part of the square root, then the remainder r is defined as:

$$r = y - x^2$$

The remainder will never be greater than 2r, else the root could be increased and remainder decreased. Therefore, remainder requires one bit more than the root, which requires only B bits.

It is possible to obtain greater precision. The chain of processing elements is extended one element for each additional bit of precision desired. This computes beyond the binary point of the input data. The number of bits deployed for the root and the remainder must be increased to span the desired resolution.

Figure 8:
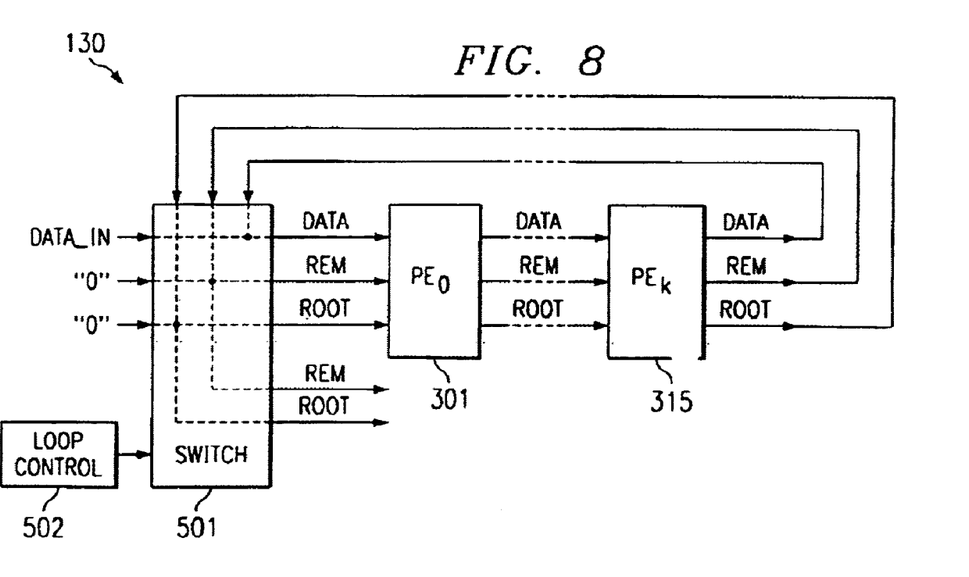
FIG. 8 illustrates an alternative embodiment of the square root unit using recirculation through a chain of processing elements.

FIG. 8 illustrates an alternative embodiment for square root unit 130. This alternative requires less hardware and thus less integrated circuit area at the expense of greater time required to generate the square root. The number of processing elements is selected as an integral factor of the number of bits of precision desired in the square root. Thus, for example, 8 processing elements 301 . . . 315 could be employed for 16 bit roots.

Switch 501 controls recirculation of data through the processing elements. Switch 501 has two states. In a first state, input data is supplied to the first processing element 301 and the remainder and root from the last processing element are output. In a second state, the data, remainder and root from the last processing element is recirculated into the first processing element. FIG. 8 illustrates the zero remainder and root inputs coming from outside switch 501. These inputs could be hardwired as part of the first switch state.

Suppose the chain included 8 processing elements. Then the 16 bit square roots can be extracted from 32 bit data in two passes through the chain. Under control of loop control 502, switch 501 would alternately: in the first switch state input new data and output a calculated root; and in the second switch state recirculate data through the chain of processing elements. Note that other ratios are possible. If the chain of processing elements was one quarter the length required for the desired root precision, switch 501 would recirculate three out of four cycles and enter new data only once every fourth cycle.

What is claimed is:

1. An apparatus for computing the absolute value of a complex number having a real part and an imaginary part, wherein the real and imaginary parts of the complex number are each represented by a digital number of B bits, where B is an integral factor of 4, the apparatus comprising:
   a first squaring unit having an input receiving said real part of said complex number and an output generating a first square of said real part multiplied with itself;
   a second squaring unit having and input receiving said imaginary part of said complex number and an output generating a second of said imaginary part multiplied with itself;
   said first squaring unit and said second squaring unit each include:
      a first multiplier having a first input receiving a set of B/2 least significant bits of said input, a second input receiving said set of B/2 least significant bits of said input and a product output generating a first product of said B least significant bits multiplied by itself,
      a second multiplier having a first input receiving a set of B/2 most significant bits of said input, a second input receiving said set of B/2 most significant bits of said input and a product output generating a second product of said B most significant bits multiplied by itself,
      a third multiplier having a first input receiving said set of B/2 least significant bits of said input, a second input receiving said set of B/2 most significant bits of said input and a product output generating a third product of said B least significant bits multiplied by said B most significant bits,
      a shift unit having an input receiving said product output of said third multiplier and a shift generating a left shifted output left shifted by (B/2)+1 bits, and
      a summing unit having a first input having least significant bits receiving said first product and most significant bits receiving said second product, a second input receiving said left shifted output and generating a sum output being a sum of said first and second inputs, said sum output being said output of said squaring unit;
   said first multiplier of each of said first squaring unit and said second squaring unit includes
      a fourth multiplier having a tenth input receiving a set of B/4 least significant bits of said first input of said corresponding multiplier, a second input receiving said set of B/4 least significant bits of said first input of said corresponding multiplier and a product output generating a fourth product of said B/4 least significant bits multiplied by itself,
      a fifth multiplier having a first input receiving a set of B/4 most significant bits of said first input of said corresponding multiplier, a second input receiving said set of B/4 most significant bits of said first input of said corresponding multiplier and a product output generating a fifth product of said B/4 most significant bits multiplied by itself,
      a sixth multiplier having a first input receiving said set of B/4 least significant bits of said first input of said corresponding multiplier, a second input receiving said set of B/4 most significant bits of said first input of said corresponding multiplier an a product output generating a sixth product of said B/4 least significant bits multiplied by said B/4 most significant bits,
      a shift unit having an input receiving said output of said sixth multiplier and a shift output generating an left shifted output left shifted by (B/4)+1 bits, and
      a summing unit having a first input having least significant bits receiving said third product and most significant bits receiving said fourth product, a second input receiving said left shifted output and generating a sum output being a sum of said first and second inputs, said sum output being said output of said multiplier;
   a summing unit having a first input receiving said first square, having a second input receiving said second square and an output generating a sum of said first square and said second square; and
   a square root unit having an input receiving said sum and an output generating a square root of said sum, said square root being said absolute value of said complex number.

2. The apparatus of claim 1, wherein the real and imaginary parts of the complex number are each represented by a signed digital number, and wherein:
   said first multiplier of each of said first and second squaring units is an unsigned multiplier;
   said second and third multipliers of each of said first and second squaring unit are signed multipliers; and
   said summing unit is a signed summing unit.

3. An apparatus for computing the absolute value of a complex number having a real part and an imaginary part, apparatus comprising:
   a first squaring unit having an input receiving said real part of said complex number and an output generating a first square of said real part multiplied with itself;
   a second squaring unit having and input receiving said imaginary Part of said complex number and an output generating a second of said imaginary part multiplied with itself;

a summing unit having a first input receiving said first square, having a second input receiving said second square and an output generating a sum of said first square and said second square; and a square root unit having an input receiving said sum and an output generating a square root of said sum, said square root being said absolute value of said complex number, said square root unit including a plurality of processing elements equal in number to a number of bits representing said real part and said imaginary part of said complex number disposed in a cascade chain, each processing element having
- a current data input, said current data input of a first processing element in said chain receiving said sum output of said summing unit,
- a current remainder input, said current remainder input of said first processing element in said chain receiving a zero input,
- a current root input, said current root input of said first processing element in said chain receiving a zero input,
- a next data output, said next data output connected to said current data input of a next processing element in said chain,
- a next remainder output, said next remainder output connected to said current remainder input of a next processing element in said chain, said next remainder output of a last processing element in said chain forming a remainder part of said square root,
- a next root output, said next root output connected to said current root input of a next processing element in said chain, said next root output of said last processing element in said chain forming an integer part of said square root,
- a shift unit having an input connected to said current data input and an output connected to said next data output, said shift unit left shifting said current data input two bits,
- a signed summing unit having a positive input receiving as least significant bits two most significant bits of said current data input and bits of said current remainder input left shifted two bits and a negative input having two least significant bits receiving the digital constant "01" and bits receiving said current root input left shifted two bits, said signed summing unit generating a difference output corresponding to a difference of said positive input minus said negative input and a sign bit indicating a sign of said difference,
- a first multiplexer having a first input receiving as least significant bits two most significant bits of said current data input and bits of said current remainder input left shifted two bits, a second input receiving said difference output, a control input receiving said sign bit and an output coupling a selected one of said first input and said second input dependent upon said control input, said output connected to said next remainder output, and
- a second multiplexer having a first input receiving as least significant bit a digital constant "0" and bits of said current root input left shifted one bit, a second input receiving as least significant bit a digital constant "1" and bits of said current root input left shifted one bit, a control input receiving said sign bit and an output coupling a selected one of said first input and said second input dependent upon said control input, said output connected to said next root output.

4. The apparatus of claim 3, wherein: each processing element further having
- a first data latch having an input receiving said shift unit output temporarily storing said next data output,
- a second data latch having an input receiving said output of said first multiplexer temporarily storing said next remainder output, and
- a third data latch having an input receiving said output of said second multiplexer temporarily storing said next root output.

5. The apparatus of claim 3, wherein: said square root unit includes
- at least one processing element disposed in a cascade chain, each processing element having
  - a current data input, said current data input of a first processing element in said chain receiving said sum output of said summing unit,
  - a current remainder input, said current remainder input of said first processing element in said chain receiving a zero input,
  - a current root input, said current root input of said first processing element in said chain receiving a zero input,
  - a next data output, said next data output connected to said current data input of a next processing element in said chain,
  - a next remainder output, said next remainder output connected to said current remainder input of a next processing element in said chain,
  - a next root output, said next root output connected to said current root input of a next processing element in said chain,
  - a shift unit having an input connected to said current data input and an output connected to said next data output, said shift unit left shifting said current data input two bits,
  - a signed summing unit having a positive input receiving as least significant bits two most significant bits of said current data input and bits of said current remainder input left shifted two bits and a negative input having two least significant bits receiving the digital constant "01" and bits receiving said current root input left shifted two bits, said signed summing unit generating a difference output corresponding to a difference of said positive input minus said negative input and a sign bit indicating a sign of said difference,
  - a first multiplexer having a first input receiving as least significant bits two most significant bits of said current data input and bits of said current remainder input left shifted two bits, a second input receiving said difference output, a control input receiving said sign bit and an output coupling a selected one of said first input and said second input dependent upon said control input, said output connected to said next remainder output, and
  - a second multiplexer having a first input receiving as least significant bit a digital constant "0" and bits of said current root input left shifted one bit, a second input receiving as least significant bit a digital constant "1" and bits of said current root input left shifted one bit, a control input receiving said sign bit and an output coupling a selected one of said first input and said second input dependent upon said control input, said output connected to said next root output; a switch having
    - a first data input receiving said sum output of said summing unit, a second data input receiving said next data output of a last processing element in said chain, a remainder input receiving said next remainder output of said last processing element in said chain, a root input receiving said next root output of said last processing element in said chain, a data output connected to said current data input of a first processing element in said chain, a first remainder output connected to said current remainder input of said first processing element in said chain, a first root output connected to said current root of said first processing element in said chain, a second remainder output a remainder part of said square root, and a second root output forming an integer part of said square root, said switch having a first state connecting said first input data to said data output, a digital constant "0" to said first remainder output, a digital constant "0" to said first root output and said root input to said second root output, said switch having a second state connecting said second data input to said data output, said remainder input to said first remainder output and said root input to said first root output; and a loop control connected to said switch, said loop control controlling said first and second states of said switch to input data to said chain of processing elements, recirculate said data, remainder and root from said last processing element in said chain to said first processing element in said chain at least once, and output a calculated root.

6. The apparatus of claim 5, wherein:

said first state of said switch further connects said remainder input to said remainder output.

7. The apparatus of claim 5, wherein:

each processing element further having
 a first data latch having an input receiving said shift unit output temporarily storing said next data output,
 a second data latch having an input receiving said output of said first multiplexer temporarily storing said next remainder output, and
 a third data latch having an input receiving said output of said second multiplexer temporarily storing said next root output.

\* \* \* \* \*